(12) United States Patent
Iwashiro

(10) Patent No.: US 11,996,127 B2
(45) Date of Patent: May 28, 2024

(54) METHOD FOR MANUFACTURING DISK DEVICE AND COMPUTER PROGRAM PRODUCT

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Masafumi Iwashiro, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 18/178,935

(22) Filed: Mar. 6, 2023

(65) Prior Publication Data

US 2024/0087602 A1 Mar. 14, 2024

(30) Foreign Application Priority Data

Sep. 12, 2022 (JP) ................. 2022-144372

(51) Int. Cl.
*G11B 20/10* (2006.01)
*G11B 5/54* (2006.01)
*G11B 5/596* (2006.01)

(52) U.S. Cl.
CPC .................. *G11B 5/596* (2013.01)

(58) Field of Classification Search
CPC ....... G11B 5/09; G11B 20/10; G11B 20/0013; G11B 5/00; G11B 5/035; G11B 20/10046; G11B 20/10027; G11B 5/54; G11B 5/556
USPC .......................................... 360/75
See application file for complete search history.

(56) References Cited

U.S. PATENT DOCUMENTS

| | | | |
|---|---|---|---|
| 7,576,940 B2 | 8/2009 | Lee et al. | |
| 9,361,919 B1 | 6/2016 | Lieu et al. | |
| 9,620,160 B1* | 4/2017 | Byoun | G11B 19/042 |
| 2010/0054098 A1 | 3/2010 | Dunn | |
| 2013/0030743 A1 | 1/2013 | Ishihara et al. | |
| 2022/0115038 A1 | 4/2022 | Calfee et al. | |

FOREIGN PATENT DOCUMENTS

| | | |
|---|---|---|
| JP | 2010-055733 | 3/2010 |
| JP | 2013-029913 | 2/2013 |

\* cited by examiner

*Primary Examiner* — Nabil Z Hindi
(74) *Attorney, Agent, or Firm* — Knobbe, Martens, Olson & Bear, LLP

(57) ABSTRACT

According to one embodiment, first, a frequency to be corrected by an MA additional filter is specified based on a head position error spectrum and a multi-rate sensitivity characteristic, in a state before the MA additional filter is added. Then, a candidate in which a peak of the multi-rate sensitivity characteristic is equal to or less than a threshold value and a head position error is minimized is determined as the MA additional filter to be used, in a state in which each of a plurality of candidates of the MA additional filter is added.

8 Claims, 9 Drawing Sheets

METHOD FOR MANUFACTURING DISK DEVICE AND COMPUTER PROGRAM PRODUCT

CROSS-REFERENCE TO RELATED APPLICATIONS

This application is based upon and claims the benefit of priority from Japanese Patent Application No. 2022-144372, filed on Sep. 12, 2022; the entire contents of which are incorporated herein by reference.

FIELD

Embodiments described herein relate generally a method for manufacturing a disk device and a computer program product.

BACKGROUND

Generally, in a disk device represented by a hard disk device, a controller (software) for positioning a head such as a magnetic head is incorporated in a target position on a disk as a recording medium, that is, an access target track. The head executes a data reading/writing operation at a positioned location on the disk.

In addition, in recent years, in a disk device, there have been advanced research and development of so-called two-stage actuator that minutely moves a head of an arm by using a microactuator (MA) provided at a distal end of the arm as well as a voice coil motor (VCM) that moves the arm having the head disposed at the distal end. In this case, the controller is divided into a VCM controller and an MA controller.

In addition, research and development of multi-rate control in which the VCM and the MA are controlled at N times (N: an integer of 2 or more) the observation cycle of a position error signal (PES) is also in progress for a disk device of two-stage actuator.

However, in the related art, in a magnetic disk device that performs multi-rate control by two-stage actuator, accuracy of positioning of a head is not sufficient.

DETAILED DESCRIPTION

According to one embodiment, a method for manufacturing a disk device and a computer program product capable of improving positioning accuracy of a head in the disk device that performs multi-rate control with two-stage actuator are provided.

Exemplary embodiments of a method for manufacturing a disk device and a computer program product will be described below in detail with reference to the drawings. Note that the present invention is not limited to the following embodiment. In order to facilitate understanding of the embodiment, first, the related art will be described again.

RELATED ART

Figure 1:
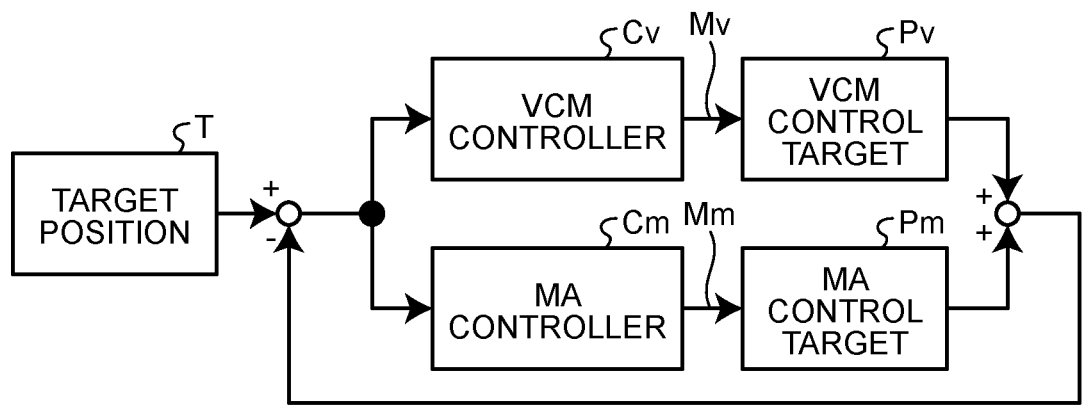
FIG. 1 is a block diagram of a feedback control system of a magnetic disk device of two-stage actuator in the related art.
Figure 2:
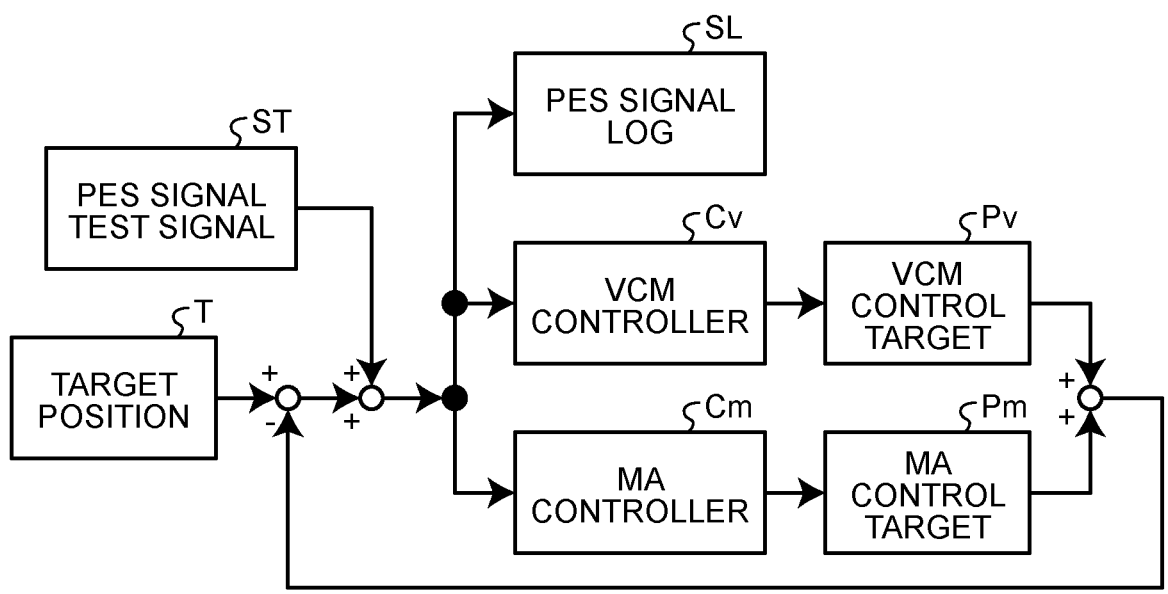
FIG. 2 is an explanatory diagram of a sensitivity characteristic measuring method of the magnetic disk device of the two-stage actuator in the related art.

FIG. 1 is a block diagram of a feedback control system (software) of a magnetic disk device of two-stage actuator in the related art. FIG. 2 is an explanatory diagram of a sensitivity characteristic measuring method of the magnetic disk device of the two-stage actuator in the related art.

As illustrated in FIG. 1, a VCM control target Pv and an MA control target Pm are arranged in parallel, a VCM controller Cv is provided for the VCM control target Pv, and an MA controller Cm is provided for the MA control target Pm. A sign My and a sign Mm are parts for performing double multi-rate control. Then, feedback control according to a target position T of the head is performed by the VCM controller Cv and the MA controller Cm. Note that an additional filter may be further added in parallel to the MA controller Cm.

Next, a sensitivity characteristic measuring method of the magnetic disk device of the two-stage actuator will be described with reference to FIG. 2. A PES signal test signal ST including a plurality of frequencies such as a sweep signal, white noise, and an M-sequence signal is added to the head position error, and the head position error is observed. The PES signal test signal ST and time-series data of the head position error are each transformed into a frequency domain by Fourier transform, and a transfer characteristic is obtained from an absolute value and a phase angle of a ratio of complex numerical values. The transfer characteristic is recorded as a PES signal log SL.

In such a controller design of the related art, controller design is performed using a numerical model of a control target, and a sensitivity characteristic is simulated. However, it is essential to correct the numerical model according to an actually measured sensitivity characteristic. However, even if the matching is performed, a deviation occurs between the expected sensitivity characteristic and the actually measured value due to the modeling error. Therefore, the positioning accuracy of the head is not sufficient, and there is room for improvement.

Therefore, in the following, a technique capable of improving the positioning accuracy of the head in the disk device that performs the multi-rate control with the two-stage actuator will be described.

Embodiment

Figure 3:
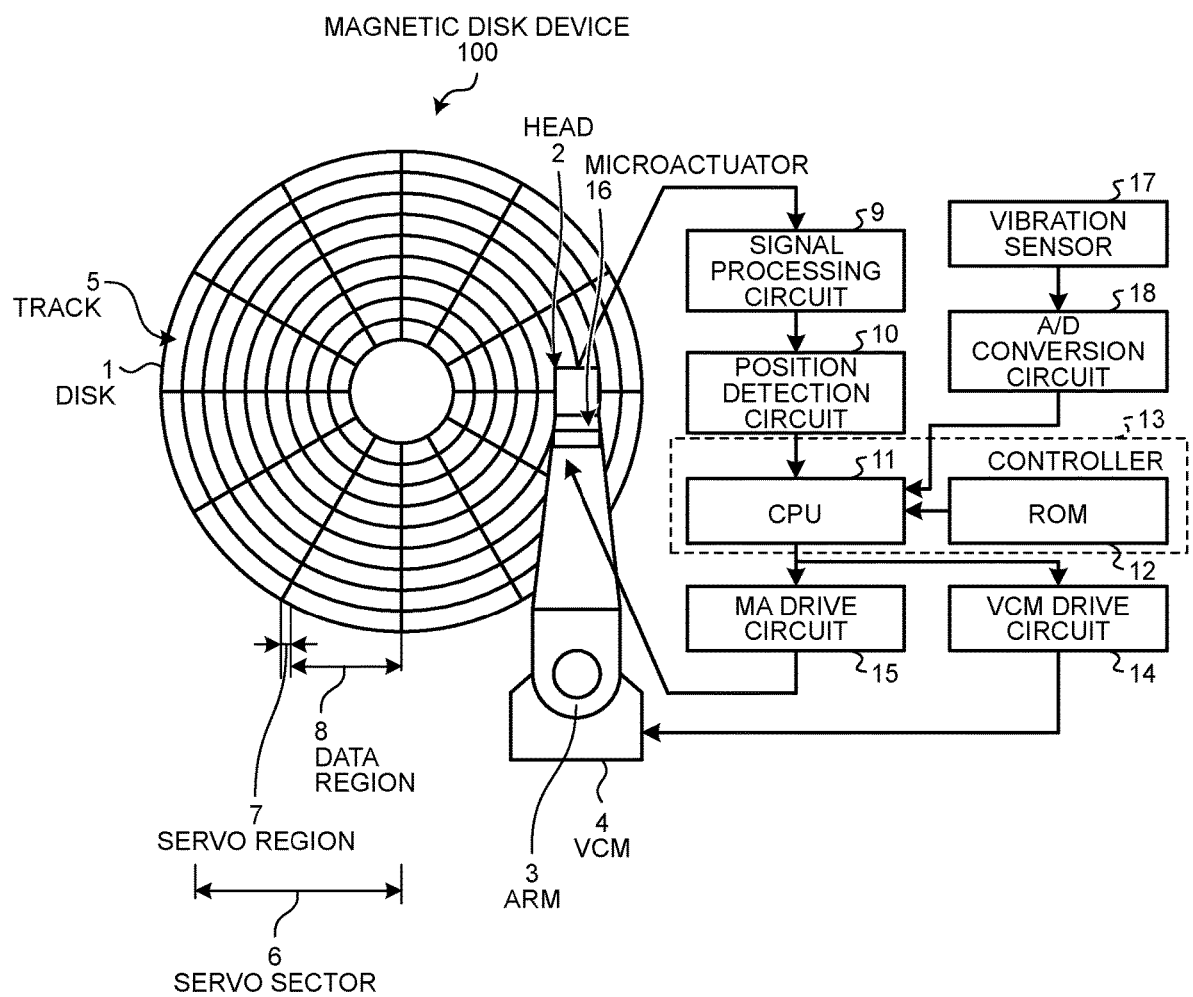
FIG. 3 is a diagram schematically illustrating a configuration of a magnetic disk device according to an embodiment.

FIG. 3 is a diagram schematically illustrating a configuration of a magnetic disk device 100 according to an embodiment. The magnetic disk device 100 includes a disk 1 that stores data, a head 2 that reads/writes data from/to the disk 1, a microactuator 16, and an arm 3 on which the head 2 is mounted.

The disk 1 is rotated by a spindle motor (not illustrated). The disk 1 is provided with a number of concentric tracks 5 on its surface. Each track 5 includes a servo sector 6. The servo sector 6 includes a servo region 7 and a data region 8. Each track 5 includes a predetermined number of servo regions 7 disposed at predetermined intervals in the circumferential direction. In the servo region 7, servo information (position information) used to detect the position of the head 2 in the head positioning control system during normal reading/writing operation is recorded. In addition, a space between the servo region 7 is the data region 8, and user data is recorded.

The head 2 has, for example, a structure in which a reading head and a writing head are separately mounted on a slider. The reading head reads servo information and user data recorded on the disk 1. During the head positioning control, the reading head reads servo information at regular intervals according to the rotation speed of the disk 1. The writing head writes user data on the disk 1.

A VCM 4 (first actuator) moves the entire arm 3 having the head 2 disposed at the distal end in the radial direction of the disk 1. The microactuator 16 (second actuator) minutely moves the head 2.

The magnetic disk device 100 further includes a reading/writing channel (a signal processing circuit 9 and a position detection circuit 10), a controller 13, a VCM drive circuit 14, an MA drive circuit 15, and a vibration sensor 17.

The signal processing circuit 9 processes a reading signal and a writing signal corresponding to servo information and user data read from the reading head included in the head 2. In addition, the position detection circuit 10 extracts servo information from the reading signal and generates a position detection signal for detecting the position of the head 2.

The controller 13 includes a central processing unit (CPU) 11 that is a main element of the head positioning control system, and a ROM 12 that stores programs (for example, firmware) and various control parameters. A CPU 11 realizes a feedback control system and a feedforward control system constituting the head positioning control system. The CPU 11 calculates a control value (including an operation amount), controls a drive current supplied to the VCM 4 and the microactuator 16 via the VCM drive circuit 14 and the MA drive circuit 15, and executes a head positioning operation.

The vibration sensor 17 detects (observes) acceleration of a disturbance (external vibration or excitation external force) corresponding to vibration or impact applied to the magnetic disk device 100, and outputs a detection signal (analog signal) to an A/D conversion circuit 18. The A/D conversion circuit 18 converts a detection signal (acceleration signal) of the vibration sensor 17 into a digital value and outputs the digital value to the CPU 11. The vibration sensor 17 is, for example, a shock sensor or an RV sensor.

In addition, the controller 13 functions as a first controller that controls the VCM 4 according to the target position of the head 2 at a multi-rate which is an 1/N cycle (N: an integer of 2 or more) of the head position observation cycle.

In addition, the controller 13 functions as a second controller that controls the microactuator 16 according to the target position of the head 2 at an 1/N cycle.

Hereinafter, a method of creating an MA additional filter Ca (FIG. 5) (second additional filter) will be described. The operation subject that performs the arithmetic operation may be referred to as an "arithmetic operation unit". The arithmetic operation unit is realized by, for example, the CPU 11, but may be realized by other arithmetic operation means.

The outline of the creation of the MA additional filter Ca will be described. First, the arithmetic operation unit executes steps of measuring a head position error spectrum and a frequency characteristic by individually adding a test signal at an 1/N cycle to the operation amount of the VCM 4 and the operation amount of the microactuator 16 in a state before the MA additional filter Ca is added, calculating a multi-rate sensitivity characteristic based on the frequency characteristic, and specifying a frequency to be corrected by the MA additional filter Ca based on the head position error spectrum and the multi-rate sensitivity characteristic.

Next, the arithmetic operation unit executes steps of measuring, with respect to the specified frequency, a frequency characteristic by individually adding the test signal at the 1/N cycle to the operation amount of the VCM 4 and the operation amount of the microactuator 16 in a state in which each of the plurality of candidates of the MA additional filter Ca is added, calculating a multi-rate sensitivity characteristic based on the frequency characteristic, and determining, as the MA additional filter Ca to be used, a candidate in which the peak of the multi-rate sensitivity characteristic is equal to or less than the threshold value and the head position error is minimized. Details will be described below.

Figure 4A:
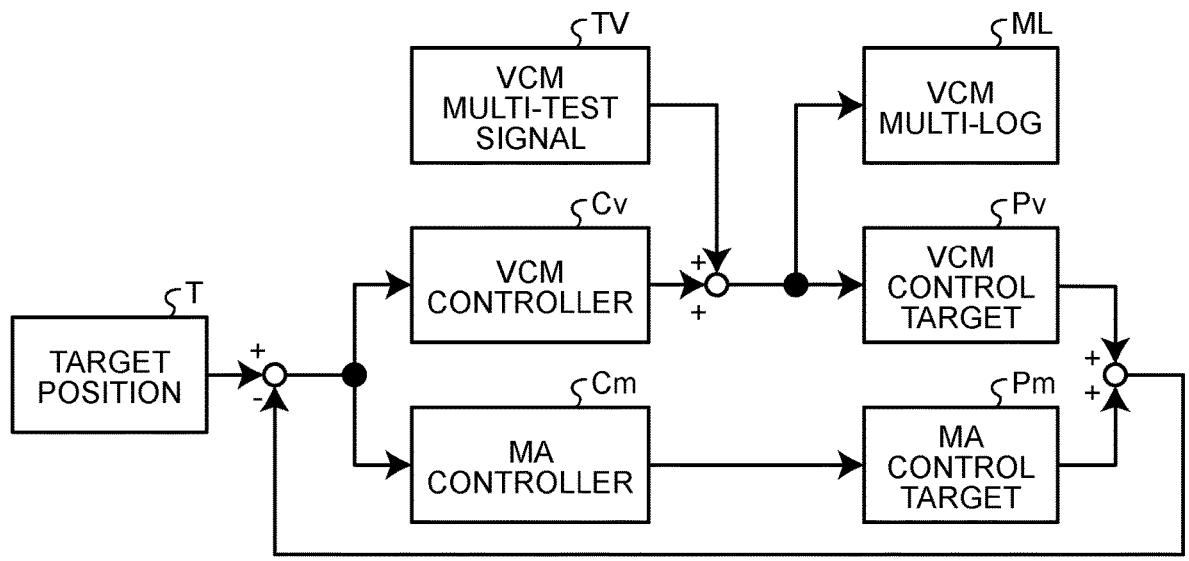
FIG. 4A is an explanatory diagram of a sensitivity characteristic measuring method of the magnetic disk device in the embodiment.
Figure 4B:
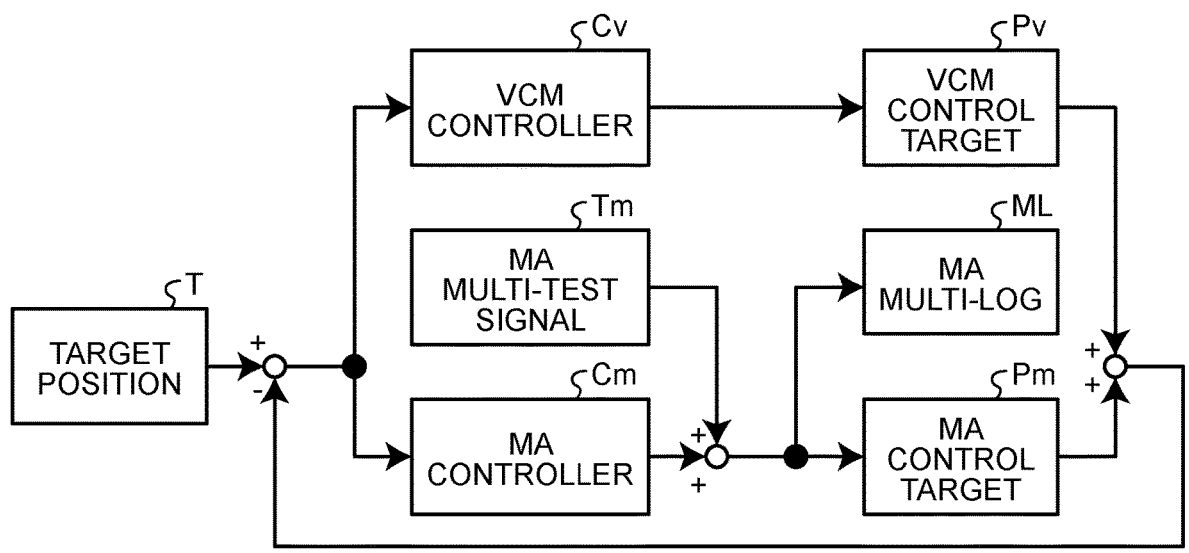
FIG. 4B is an explanatory diagram of the sensitivity characteristic measuring method of the magnetic disk device in the embodiment.

FIGS. 4A and 4B are explanatory diagrams of the sensitivity characteristic measuring method of the magnetic disk device 100 in the embodiment. Hereinafter, the VCM 4 may be referred to as "VCM", and the microactuator 16 may be referred to as MA".

As illustrated in FIGS. 4A and 4B, the multi-rate test signal is individually added to the operation amounts of the VCM and the MA of the double multi-rate, and the multi-rate operation amount time-series is logged (recorded as the VCM multi-log ML). Assuming that the VCM multi-rate test signal time-series is Tv, the MA multi-rate test signal time-series is Tm, the VCM multi-rate operation amount obtained by adding the test signals is Iv, and the MA multi-rate operation amount is Im, the frequency characteristics Kv and Km are defined as in the following Equation (1).

$$Kv = \text{FFT}(Iv)/\text{FFT}(Tv)$$

$$Km = \text{FFT}(Im)/\text{FFT}(Tm) \quad (1)$$

Here, FFT represents time-series fast Fourier transform. In addition, FFT (Iv), FFT (Tv), FFT (Im), and FFT (Tm) are vectors each having a complex number calculated by fast Fourier transform as an element. In addition, FFT (Iv)/FFT (Tv) and FFT (Im)/FFT (Tm) mean division of vectors for each element.

After measuring the frequency characteristics Kv and Km, a predicted value of sensitivity measurement of the feedback system is obtained by post-processing the numerical data. Here, assuming that the VCM controller characteristic is Cv, the VCM control target characteristic is Pv, the MA controller characteristic is Cm, and the MA control target characteristic is Pm, measurable frequency characteristic represents the transfer characteristic of the following Equation (2).

$$Kv=(1+Cm*Pm)/(1+Cv*Pv+Cm*Pm)$$

$$Km=(1+Cv*Pv)/(1+Cv*Pv+Cm*Pm) \quad (2)$$

This characteristic is post-operated (equation deformation) by Matlab (one of numerical calculation platforms) and the like to obtain the following (Equation 3).

$$Cv*Pv=(Kv-1)/(1-Kv-Km)$$

$$Cm*Pm=(Km-1)/(1-Kv-Km) \quad (3)$$

In addition, the multi-rate open loop characteristic is represented by the following (Equation 4).

$$Om=Cv*Pv+Cm*Pm \quad (4)$$

In addition, the single-rate open loop characteristic becomes the following (Equation 5) in consideration of folding back of the Nyquist frequency (half of the sampling frequency).

$$Os=Om+\text{conj}(\textit{flipud}(Om)) \quad (5)$$

Here, conj represents a conjugate complex number arithmetic operation, and flipud represents a folding arithmetic operation. Then, the following (Equation 6) is finally obtained as the sensitivity characteristic.

Multi-rate sensitivity characteristic: $1/(1+Om)$

Single-rate sensitivity characteristic: $1/(1+Os)$ (6)

Figure 5:
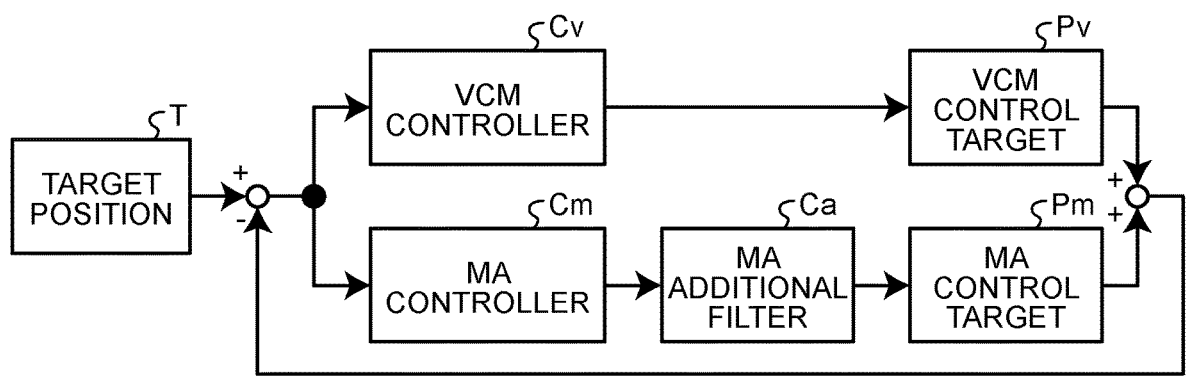
FIG. 5 is a block diagram of a feedback control system of the magnetic disk device in the embodiment.

FIG. 5 is a block diagram of a feedback control system of the magnetic disk device 100 in the embodiment. In FIG. 5, the MA additional filter Ca is added to FIG. 1. The MA additional filter Ca is added between the MA controller Cm (second controller) and the MA control target Pm (second actuator), and outputs the output data to the MA control target Pm according to the input data from the MA controller Cm.

The order of designing the MA additional filter Ca based on the above-described multi-rate sensitivity measurement result is as follows.

First, a VCM characteristic Cv*Pv, a MA characteristic Cm*Pm, a multi-rate sensitivity Km, and a single-rate sensitivity Sm are measured, and for Km, the maximum gain value Xm=max (abs (Km)) and a frequency Fm at that time are calculated. Note that "abs" means an absolute value.

Figure 7:
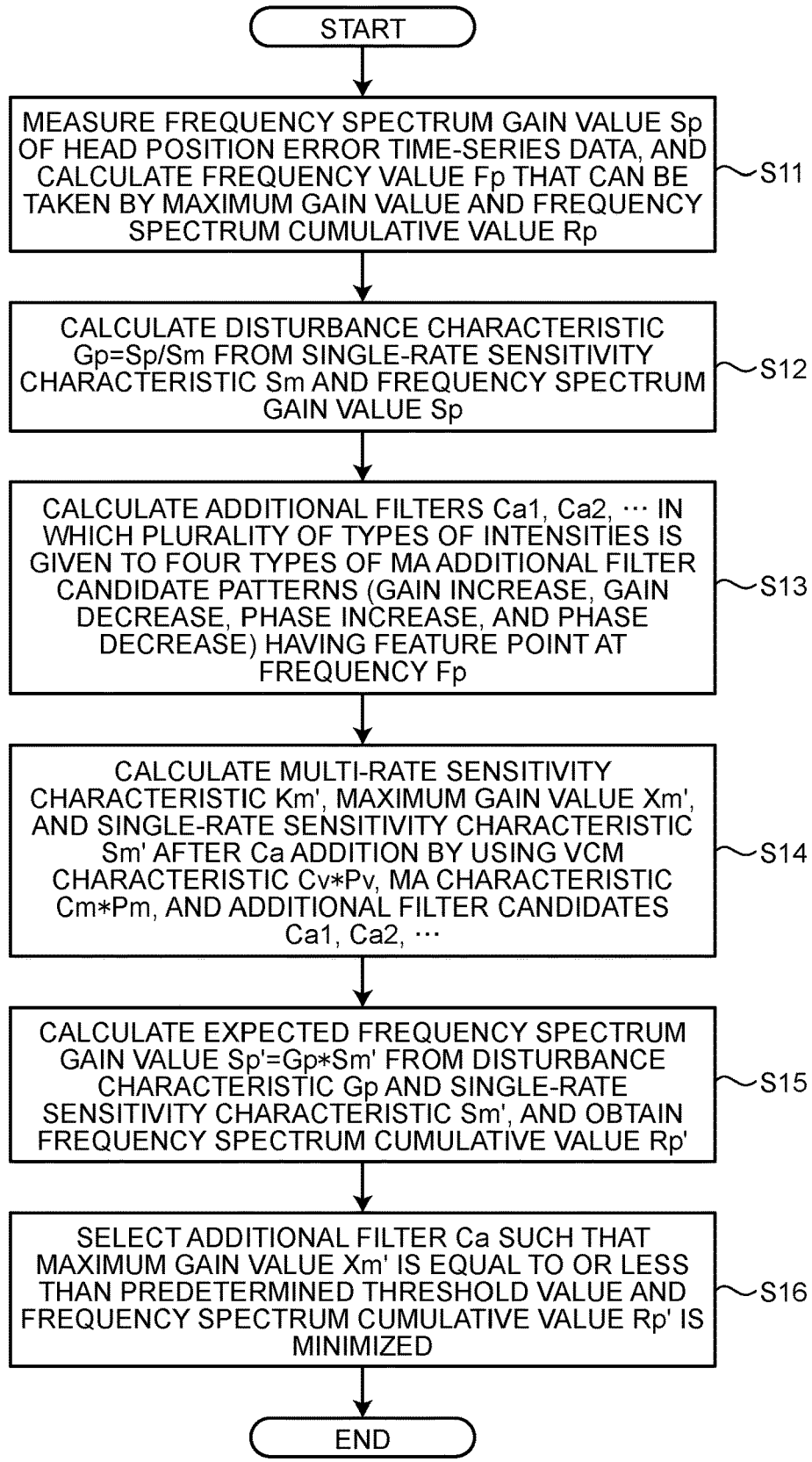
FIG. 7 is a flowchart illustrating generation processing of the MA additional filter in a case where a maximum gain value of a multi-rate sensitivity characteristic is equal to or less than a threshold value in the embodiment.
Figure 8:
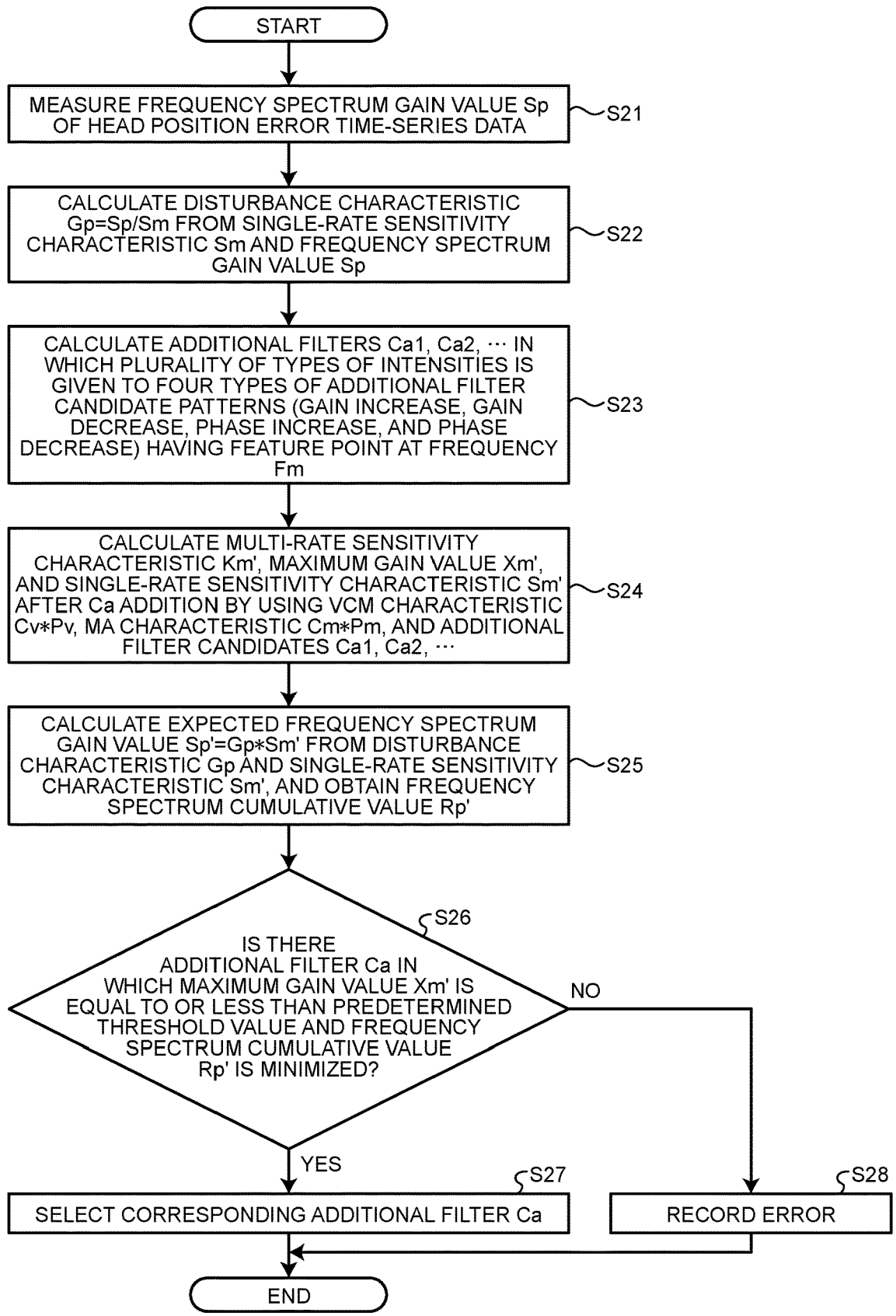
FIG. 8 is a flowchart illustrating generation processing of the MA additional filter in a case where a maximum gain value of the multi-rate sensitivity characteristic is larger than the threshold value in the embodiment.

Then, in a case where Xm is equal to or less than the predetermined threshold value, the processing proceeds to the processing of FIG. 7, and in a case where Xm is larger than the threshold value, the processing proceeds to the processing of FIG. 8.

FIG. 7 is a flowchart illustrating generation processing of the MA additional filter in a case where a maximum gain value Xm of a multi-rate sensitivity characteristic is equal to or less than a threshold value (that is, in a case where there is no problem in the current multi-rate sensitivity characteristic Km) in the embodiment.

First, in step S11, the arithmetic operation unit measures a frequency spectrum gain value Sp of the head position error time-series data, and calculates a frequency value Fp that can be taken by the maximum gain value and a frequency spectrum cumulative value Rp.

Next, in step S12, the arithmetic operation unit calculates a disturbance characteristic Gp=Sp/Sm from the single-rate sensitivity characteristic Sm and the frequency spectrum gain value Sp.

Figure 6:
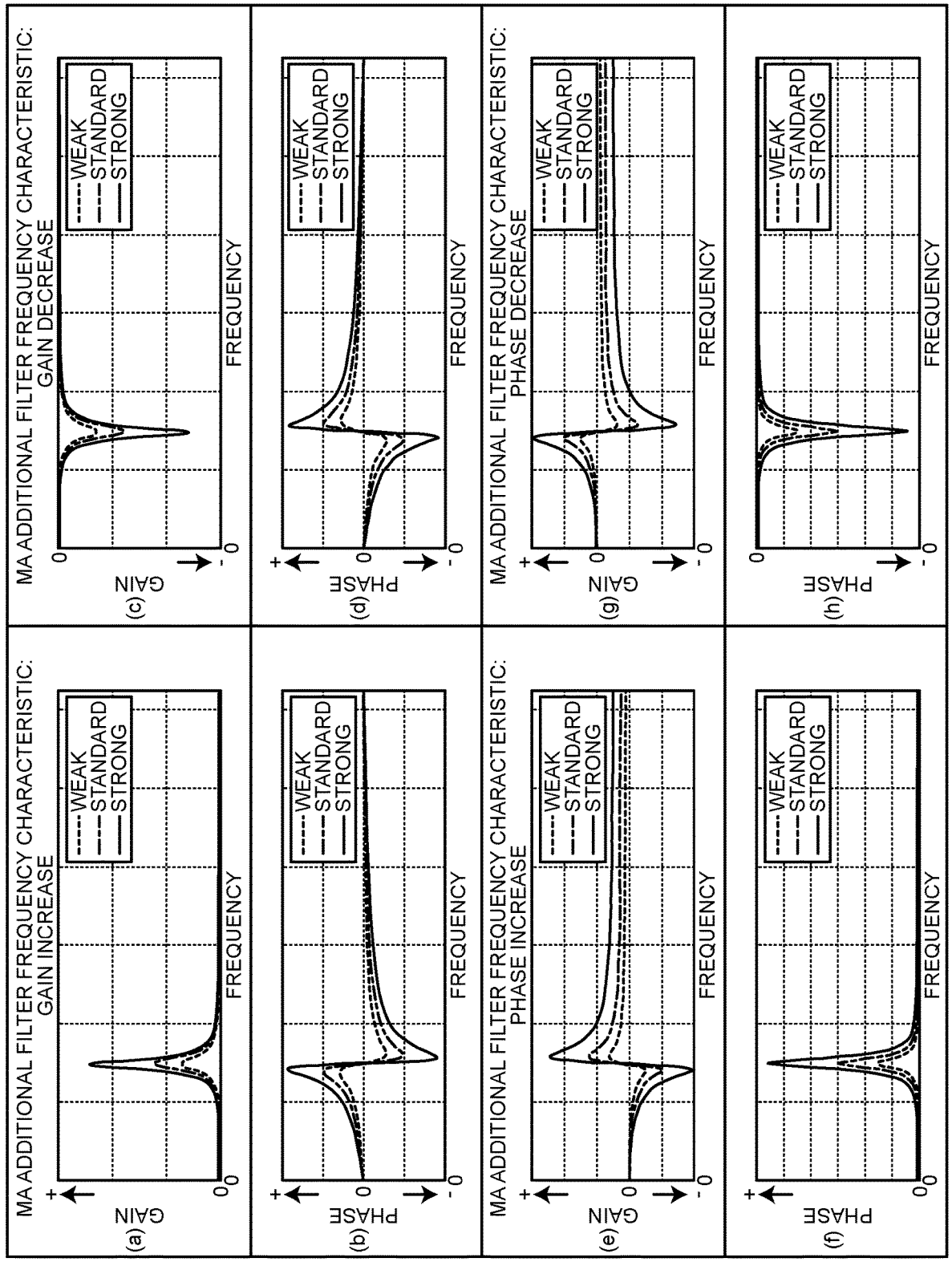
FIG. 6 is a diagram illustrating four types of patterns of candidates of an MA additional filter in the embodiment.

Next, in step S13, the arithmetic operation unit calculates additional filters Ca1, Ca2, . . . in which a plurality of types (here, three types of "strong", "standard", and "weak" are used) of intensities is given to the four types of MA additional filter candidate patterns (gain increase, gain decrease, phase increase, and phase decrease) illustrated in FIG. 6 having a feature point at a frequency Fp.

Next, in step S14, the arithmetic operation unit calculates a multi-rate sensitivity characteristic Km', a maximum gain value Xm', and a single-rate sensitivity characteristic Sm' after Ca addition by using the VCM characteristic Cv*Pv, the MA characteristic Cm*Pm, and additional filter candidates Ca1, Ca2, . . . .

Next, in step S15, the arithmetic operation unit calculates an expected frequency spectrum gain value Sp'=Gp*Sm' from the disturbance characteristic Gp and the single-rate sensitivity characteristic Sm', and obtains a frequency spectrum cumulative value Rp'.

Next, in step S16, the arithmetic operation unit selects the additional filter Ca such that the maximum gain value Xm' is equal to or less than a predetermined threshold value and the frequency spectrum cumulative value Rp' is minimized, and ends the design.

FIG. 8 is a flowchart illustrating generation processing of the MA additional filter in a case where a maximum gain value of the multi-rate sensitivity characteristic is larger than the threshold value (that is, in a case where there is a problem in the current multi-rate sensitivity characteristic Km) in the embodiment.

First, in step S21, the arithmetic operation unit measures the frequency spectrum gain value Sp of the head position error time-series data.

Next, in step S22, the arithmetic operation unit calculates a disturbance characteristic Gp=Sp/Sm from the single-rate sensitivity characteristic Sm and the frequency spectrum gain value Sp.

Next, in step S23, the arithmetic operation unit calculates the additional filters Ca1, Ca2, . . . in which a plurality of types of intensities is given to the four types of additional filter candidate patterns (gain increase, gain decrease, phase increase, and phase decrease) illustrated in FIG. 6 having a feature point at the frequency Fm.

Next, in step S24, the arithmetic operation unit calculates the multi-rate sensitivity characteristic Km', the maximum gain value Xm', and the single-rate sensitivity characteristic Sm' after Ca addition by using the VCM characteristic Cv*Pv, the MA characteristic Cm*Pm, and the additional filter candidates Ca1, Ca2, . . . .

Next, in step S25, the arithmetic operation unit calculates the expected frequency spectrum gain value Sp'=Gp*Sm' from the disturbance characteristic Gp and the single-rate sensitivity characteristic Sm', and obtains the frequency spectrum cumulative value Rp'.

Next, in step S26, the arithmetic operation unit determines whether or not there is the additional filter Ca in which the maximum gain value Xm' is equal to or less than a predetermined threshold value and the frequency spectrum cumulative value Rp' is minimized. If Yes, the processing proceeds to step S27, and if No, the processing proceeds to step S28.

In step S27, the arithmetic operation unit selects the corresponding additional filter Ca and ends the design.

In step S28, since the maximum gain value Xm' does not fall below the predetermined threshold value in all the MA additional filter candidates, the arithmetic operation unit records the error in the non-volatile memory inside the drive or the drive management information on the disk 1.

Figure 9:
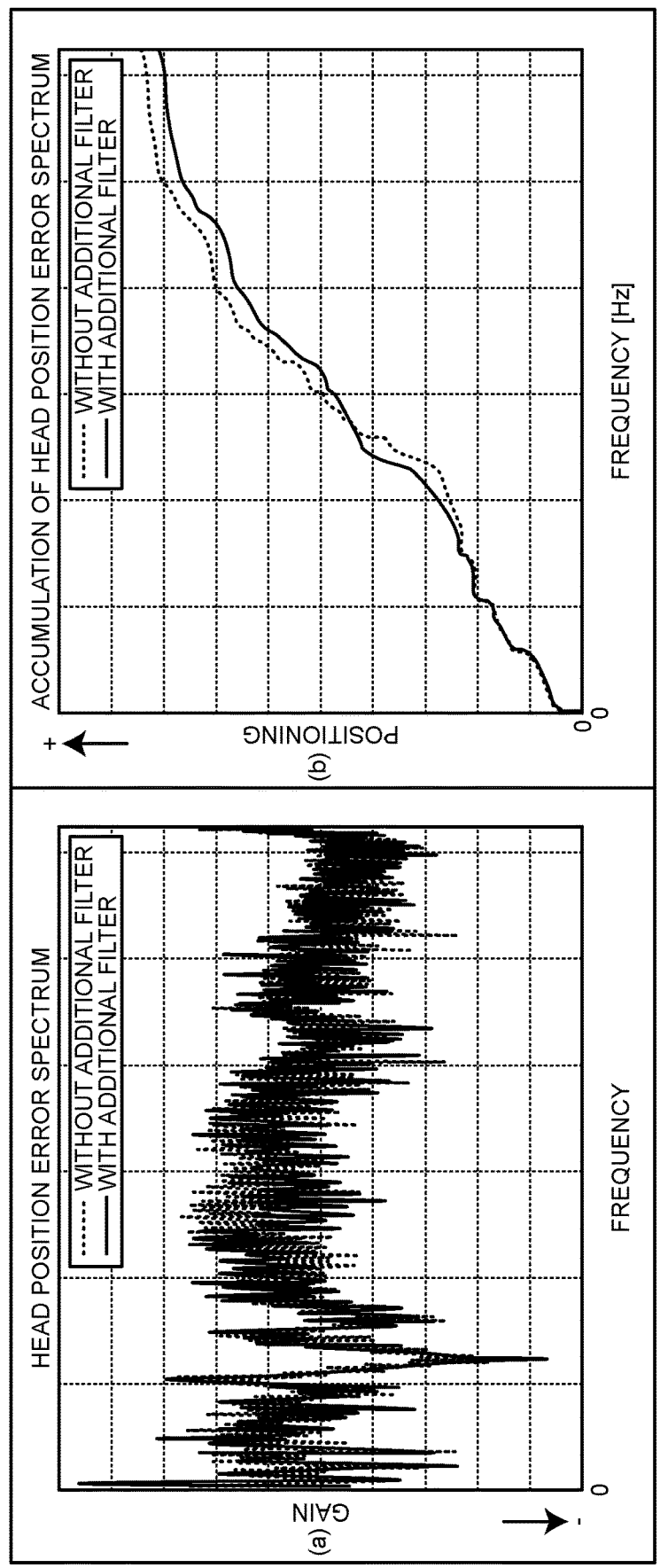
FIG. 9 is a diagram illustrating a head position error spectrum before and after the MA additional filter is designed in the embodiment.

Next, effects obtained by adding the MA additional filter Ca will be described. FIG. 9 is a diagram illustrating a head position error spectrum before and after the MA additional filter is designed in the embodiment.

By adding the MA additional filter Ca for a specific frequency, the gain of the head position error spectrum is lowered (FIG. 9(a)), and it can be seen that the positioning accuracy is improved even in the accumulation of the head position error spectrum (FIG. 9(b)).

Figure 10:
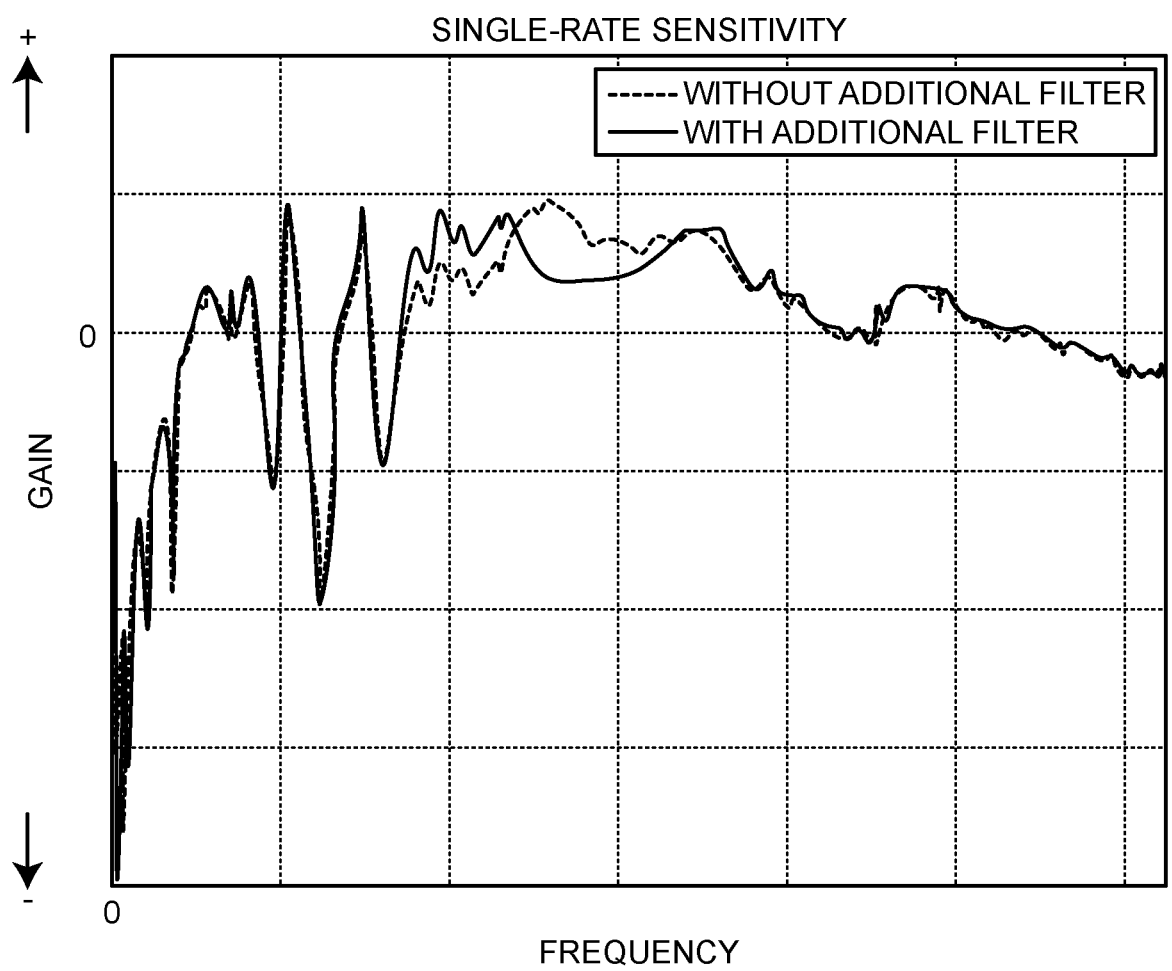
FIG. 10 is a diagram illustrating a single-rate sensitivity characteristic before and after the MA additional filter is designed in the embodiment.

FIG. 10 is a diagram illustrating a single-rate sensitivity characteristic before and after the MA additional filter is designed in the embodiment. It can be seen that the gain of the single-rate sensitivity decreases and the positioning accuracy is improved by adding the MA additional filter Ca for a specific frequency.

As described above, according to the present embodiment, in the magnetic disk device 100 that performs the multi-rate control by the two-stage actuator, the MA additional filter Ca created as described above is added between the MA controller Cm and the MA control target Pm. Thus, the positioning accuracy of the head can be improved.

Note that, although the MA additional filter has been described in the above embodiment, a VCM additional filter can also be created in a similar manner.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the processing of FIGS. 7 and 8, the case without the additional filter may also be used as the arithmetic operation target for comparison.

In addition, both the MA additional filter and the VCM additional filter may be created and used simultaneously.

What is claimed is:

1. A method for manufacturing a disk device including:
a disk configured to store data;
a head configured to read/write data from/to the disk;
a first actuator configured to move an entire arm having the head disposed at a distal end;
a second actuator that is provided at the distal end of the arm and moves the head;
a first controller configured to control the first actuator according to a target position of the head at a multi-rate that is a 1/N cycle (N: an integer of 2 or more) of a head position observation cycle;
a second controller configured to control the second actuator according to the target position of the head at the 1/N cycle; and
a first additional filter that is added between the first controller and the first actuator and outputs output data to the first actuator according to input data from the first controller,
the method comprising:
by an arithmetic operation unit, measuring a head position error spectrum and a frequency characteristic by individually adding a test signal to an operation amount of the first actuator and an operation amount of the second actuator at the 1/N cycle in a state before the first additional filter is added, calculating a multi-rate sensitivity characteristic based on the frequency characteristic, and specifying a frequency to be corrected by the first additional filter based on the head position error spectrum and the multi-rate sensitivity characteristic; and
by the arithmetic operation unit, measuring, with respect to the frequency, a frequency characteristic by individually adding the test signal at the 1/N cycle to the operation amount of the first actuator and the operation amount of the second actuator in a state in which each of a plurality of candidates of the first additional filter is added, calculating a multi-rate sensitivity characteristic based on the frequency characteristic, and determining, as the first additional filter to be used, a candidate in which a peak of the multi-rate sensitivity characteristic is equal to or less than a threshold value and a head position error is minimized.

2. The method according to claim 1, further comprising, by the arithmetic operation unit, recording an error in drive management information when the peak of the multi-rate sensitivity characteristic is not equal to or less than the threshold value for all of the plurality of candidates of the first additional filter.

3. A method for manufacturing a disk device including:
a disk configured to store data;
a head configured to read/write data from/to the disk;
a first actuator configured to move an entire arm having the head disposed at a distal end;
a second actuator that is provided at the distal end of the arm and moves the head;
a first controller configured to control the first actuator according to a target position of the head at a multi-rate that is a 1/N cycle (N: an integer of 2 or more) of a head position observation cycle;
a second controller configured to control the second actuator according to the target position of the head at the 1/N cycle; and
a second additional filter that is added between the second controller and the second actuator and outputs output data to the second actuator according to input data from the second controller,
the method comprising:
by an arithmetic operation unit, measuring a head position error spectrum and a frequency characteristic by individually adding a test signal to an operation amount of the first actuator and an operation amount of the second actuator at the 1/N cycle in a state before the second additional filter is added, calculating a multi-rate sensitivity characteristic based on the frequency characteristic, and specifying a frequency to be corrected by the second additional filter based on the head position error spectrum and the multi-rate sensitivity characteristic; and
by the arithmetic operation unit, measuring, with respect to the frequency, a frequency characteristic by individually adding the test signal at the 1/N cycle to the operation amount of the first actuator and the operation amount of the second actuator in a state in which each of a plurality of candidates of the second additional filter is added, calculating a multi-rate sensitivity characteristic based on the frequency characteristic, and determining, as the second additional filter to be used, a candidate in which a peak of the multi-rate sensitivity characteristic is equal to or less than a threshold value and a head position error is minimized.

4. The method according to claim 3, further comprising, by the arithmetic operation unit, recording an error in drive management information when the peak of the multi-rate sensitivity characteristic is not equal to or less than the threshold value for all of the plurality of candidates of the second additional filter.

5. A computer program product comprising a non-transitory computer readable medium that stores instructions to be used for manufacturing a disk device including:
   a disk configured to store data;
   a head configured to read/write data from/to the disk;
   a first actuator configured to move an entire arm having the head disposed at a distal end;
   a second actuator that is provided at the distal end of the arm and moves the head;
   a first controller configured to control the first actuator according to a target position of the head at a multi-rate that is a 1/N cycle (N: an integer of 2 or more) of a head position observation cycle;
   a second controller configured to control the second actuator according to the target position of the head at the 1/N cycle; and
   a first additional filter that is added between the first controller and the first actuator and outputs output data to the first actuator according to input data from the first controller,
   the instructions causing the computer to execute:
   measuring a head position error spectrum and a frequency characteristic by individually adding a test signal to an operation amount of the first actuator and an operation amount of the second actuator at the 1/N cycle in a state before the first additional filter is added, calculating a multi-rate sensitivity characteristic based on the frequency characteristic, and specifying a frequency to be corrected by the first additional filter based on the head position error spectrum and the multi-rate sensitivity characteristic; and
   measuring, with respect to the frequency, a frequency characteristic by individually adding the test signal at the 1/N cycle to the operation amount of the first actuator and the operation amount of the second actuator in a state in which each of a plurality of candidates of the first additional filter is added, calculating a multi-rate sensitivity characteristic based on the frequency characteristic, and determining, as the first additional filter to be used, a candidate in which a peak of the multi-rate sensitivity characteristic is equal to or less than a threshold value and a head position error is minimized.

6. The computer program product according to claim 5, wherein the instructions cause the computer to further execute recording an error in drive management information when the peak of the multi-rate sensitivity characteristic is not equal to or less than the threshold value for all of the plurality of candidates of the first additional filter.

7. A computer program product comprising a non-transitory computer readable medium that stores instructions to be used for manufacturing a disk device including:
   a disk configured to store data;
   a head configured to read/write data from/to the disk;
   a first actuator configured to move an entire arm having the head disposed at a distal end;
   a second actuator that is provided at the distal end of the arm and moves the head;
   a first controller configured to control the first actuator according to a target position of the head at a multi-rate that is a 1/N cycle (N: an integer of 2 or more) of a head position observation cycle;
   a second controller configured to control the second actuator according to the target position of the head at the 1/N cycle; and
   a second additional filter that is added between the second controller and the second actuator and outputs output data to the second actuator according to input data from the second controller,
   the instructions causing the computer to execute:
   measuring a head position error spectrum and a frequency characteristic by individually adding a test signal to an operation amount of the first actuator and an operation amount of the second actuator at the 1/N cycle in a state before the second additional filter is added, calculating a multi-rate sensitivity characteristic based on the frequency characteristic, and specifying a frequency to be corrected by the second additional filter based on the head position error spectrum and the multi-rate sensitivity characteristic; and
   measuring, with respect to the frequency, a frequency characteristic by individually adding the test signal at the 1/N cycle to the operation amount of the first actuator and the operation amount of the second actuator in a state in which each of a plurality of candidates of the second additional filter is added, calculating a multi-rate sensitivity characteristic based on the frequency characteristic, and determining, as the second additional filter to be used, a candidate in which a peak of the multi-rate sensitivity characteristic is equal to or less than a threshold value and a head position error is minimized.

8. The computer program product according to claim 7, wherein the instructions cause the computer to further execute recording an error in drive management information when the peak of the multi-rate sensitivity characteristic is not equal to or less than the threshold value for all of the plurality of candidates of the second additional filter.

* * * * *